United States Patent
Yamaguchi et al.

(10) Patent No.: US 9,319,163 B2
(45) Date of Patent: Apr. 19, 2016

(54) WIRELESS COMMUNICATION NETWORK SYSTEM SYNCHRONIZATION METHOD

(71) Applicant: THE NIPPON SIGNAL CO., LTD., Tokyo (JP)

(72) Inventors: Terufumi Yamaguchi, Kuki (JP); Hiroki Saito, Kuki (JP); Yuhei Otsuka, Kuki (JP); Toshihito Shirai, Kuki (JP)

(73) Assignee: THE NIPPON SIGNAL CO., LTD., Tokyo (JP)

(*) Notice: Subject to any disclaimer, the term of this patent is extended or adjusted under 35 U.S.C. 154(b) by 93 days.

(21) Appl. No.: 14/228,151

(22) Filed: Mar. 27, 2014

(65) Prior Publication Data

US 2014/0211782 A1 Jul. 31, 2014

Related U.S. Application Data

(63) Continuation of application No. PCT/JP2012/074420, filed on Sep. 24, 2012.

(30) Foreign Application Priority Data

Sep. 30, 2011 (JP) ................................ 2011-218180

(51) Int. Cl.
*H04W 56/00* (2009.01)
*B61L 15/00* (2006.01)
(Continued)

(52) U.S. Cl.
CPC .............. *H04J 3/06* (2013.01); *B61L 15/0027* (2013.01); *B61L 27/0005* (2013.01); *H04B 7/026* (2013.01); *H04W 56/002* (2013.01); *H04W 56/0015* (2013.01); *H04W 56/0025* (2013.01)

(58) Field of Classification Search
None
See application file for complete search history.

(56) References Cited

U.S. PATENT DOCUMENTS 5,420,883 A 5/1995 Swensen et al.
2006/0245390 A1* 11/2006 Omoto ................ H04L 27/2608
370/328

(Continued)

FOREIGN PATENT DOCUMENTS

EP 2747501 A1 6/2014
JP 2000-102063 A 4/2000

(Continued)

OTHER PUBLICATIONS

Japanese Patent Office Communication Mailed Sep. 15, 2015 in Application No. 2011-218180, with English language translation thereof.

*Primary Examiner* — Jenee Williams
(74) *Attorney, Agent, or Firm* — McDermott Will & Emery LLP

(57) ABSTRACT

Mobile radio sets are installed on front and rear parts of a mobile body, one of fixed radio sets is set as a synchronization base station, and the other radio sets including the mobile radio sets are set as synchronization packet relay stations. Each of the relay stations in a synchronization acquiring mode makes a transition to a ground synchronization maintaining mode higher in synchronization accuracy when receiving a synchronization packet without the intervention of the mobile radio sets, or makes a transition to an on-vehicle synchronization maintaining mode lower in synchronization accuracy when receiving a synchronization packet with the intervention of the mobile radio sets, and the relay station in the on-vehicle synchronization maintaining mode makes a transition to the ground synchronization maintaining mode when receiving a synchronization packet from a relay station in the ground synchronization maintaining mode.

16 Claims, 7 Drawing Sheets

(51) Int. Cl.
*B61L 27/00* (2006.01)
*H04J 3/06* (2006.01)
*H04B 7/02* (2006.01)

(56) References Cited

U.S. PATENT DOCUMENTS

| | | | |
|---|---|---|---|
| 2008/0198799 A1* | 8/2008 | Yamasaki | H04W 16/24 370/329 |
| 2009/0279481 A1* | 11/2009 | Garcia Vidal | H04L 45/00 370/328 |
| 2010/0035641 A1 | 2/2010 | Kobayashi et al. | |
| 2010/0151789 A1* | 6/2010 | Suzuki | G01S 5/0036 455/41.2 |
| 2010/0248619 A1 | 9/2010 | Senarath et al. | |
| 2011/0216662 A1* | 9/2011 | Nie | H04W 24/00 370/252 |

FOREIGN PATENT DOCUMENTS

| | | |
|---|---|---|
| JP | 2002-012150 | 1/2002 |
| JP | 2008-062874 | 3/2008 |
| JP | 2009-194855 A | 8/2009 |
| JP | 2009-225135 | 10/2009 |
| JP | 2010-041537 A | 2/2010 |
| JP | 2010-171509 A | 8/2010 |
| WO | WO-2005/081558 A1 | 9/2005 |

* cited by examiner

WIRELESS COMMUNICATION NETWORK SYSTEM SYNCHRONIZATION METHOD

This application is a continuation application of PCT/JP2012/074420, filed on Sep. 24, 2012.

BACKGROUND OF THE INVENTION

1. Field of the Invention

The present invention relates to a synchronization method between radio sets in a wireless communication network system provided with mobile radio sets mounted on a mobile body and a plurality of fixed radio sets installed along a moving route of the mobile body to sequentially relay and transmit information, where these radio sets perform communication in a time division multiple access method, and particularly relates to a synchronization method for a wireless communication network system, that is capable of maintaining a synchronized state of each radio set even when a communication failure occurs between fixed radio sets arranged to be communicable with each other.

2. Description of Related Art

In a wireless communication network system provided with a base station for transmitting information into a control area and a plurality of radio stations wirelessly connected to this base station, it is necessary for the respective stations to be synchronized with each other in order to transmit and receive information in the time division multiple access method. As the synchronization method, it is considered a method in which all the radio stations receive a synchronization packet transmitted from the base station at the same time to achieve synchronization, or a method in which all stations within the control area receive a synchronization signal (e.g., GPS signal) at the same time to achieve synchronization. However, the method using the GPS signal requires expensive GPS receivers to be installed at all stations, which not only increase costs but also are unusable within tunnels. Furthermore, the method using the synchronization packet cannot be used in a wireless communication network system for a wide control area where radio waves from the base station cannot reach some stations such as a control area having a one-dimensional range like a case of railway train control.

Therefore, as a synchronization method in which there is no need to provide receivers for the synchronization signal at all stations and which can be applied even to a wide control area where radio waves from the base station cannot reach some radio stations, there is a synchronization method for a wireless communication network as disclosed in Japanese Laid-Open Patent Application Publication No. 2000-102063. The synchronization method disclosed in Japanese Laid-Open Patent Application Publication No. 2000-102063 is such that each radio station sequentially relays and transmits a synchronization packet transmitted from a base station to synchronize all stations including the radio stations where radio waves from the base station do not reach.

In the meantime, in the synchronization method disclosed in Japanese Laid-Open Patent Application Publication No. 2000-102063, adjacent ground radio sets perform wireless communication sequentially to relay the synchronization packet. Therefore, for example, when a train enters a tunnel to narrow the propagation space of radio waves in the tunnel due to the vehicle body and hence to attenuate the radio waves, or when each antenna of ground radio sets is located at a position lower than the vehicle height of the train so that the propagation of radio waves between ground radio sets located in front of and behind the train will be blocked by the vehicle body and this will make it hard to receive the radio waves, the relay operation of the synchronization packet cannot be performed and this may result in being incapable of maintaining the synchronized state between radio sets.

SUMMARY OF THE INVENTION

The present invention has been made by focusing attention on the above problem, and it is an object thereof to provide a synchronization method for a wireless communication network system, that is capable of continuing relay operation of synchronization information even when trouble occurs in communication between fixed radio sets to maintain the synchronized state between a base station and a relay station.

Therefore, according to a first aspect of the invention, a synchronization method for a wireless communication network system provided with mobile radio sets that are mounted on a mobile body moving along a predetermined route, and a plurality of fixed radio sets that is spatially separated and installed along the route in such a manner that adjacent fixed radio sets perform wireless communication with each other to transmit information while relaying the information from a transmission source to a terminal fixed radio set, in which the mobile radio sets and the fixed radio sets are time-synchronized in a communicable manner to perform communication, in which the mobile radio sets are installed on front and rear parts of the mobile body in a manner to be communicable with each other, and when the mobile body exists between fixed radio sets, synchronization information between the fixed radio sets can be relayed by the two mobile radio sets mounted on the mobile body.

In such a configuration, when there is a possibility that a relay of synchronization information between fixed radio sets arranged to be wirelessly communicable with each other will be blocked by the mobile body, synchronization information is received by a mobile radio set closer to a fixed radio set on the transmission side out of the mobile radio sets on the front and rear parts of the mobile body, the received synchronization information is transmitted to the other mobile radio set, and the synchronization information is transmitted from the other mobile radio set to a fixed radio set on the reception side, to relay the synchronization information using the two mobile radio sets of the mobile body.

Furthermore, according to a second aspect of the invention, a synchronization method for a wireless communication network system provided with mobile radio sets that are mounted on a mobile body moving along a predetermined route, and a plurality of fixed radio sets that is spatially separated and installed along the route in such a manner that adjacent fixed radio sets perform wireless communication with each other to transmit information while relaying the information from a transmission source to a terminal fixed radio set, in which the mobile radio sets and the fixed radio sets are time-synchronized in a communicable manner to perform communication, in which at least one of the fixed radio sets is set as a base station for transmitting a synchronization packet as synchronization information, and the other fixed radio sets are set as relay stations for relaying the synchronization packet transmitted from the base station, in which each of these relay stations makes a transition to a synchronization acquiring mode that is a state of waiting for reception of a synchronization packet in response to application of power, the relay station that made the transition to the synchronization acquiring mode makes a transition to a synchronization maintaining mode when receiving a synchronization packet, so that the relay station can transmit the synchronization packet during a preset own synchronization packet transmission allocation period, and the relay station in the synchronization maintaining mode makes a transition to the synchronization acquiring mode when a state without reception of any synchronization packet exceeds a preset limited time of synchronization information update.

In such a configuration, at least one fixed radio set is set as a synchronization packet transmission base station, and a synchronization packet transmitted from the base station is relayed by using the other fixed radio sets as relay stations. Each of the relay stations makes a transition to the synchronization acquiring mode in response to the application of power to wait for the reception of a synchronization packet. When receiving a synchronization packet, the relay station in the synchronization acquiring mode makes a transition to the synchronization maintaining mode and comes into a synchronized state, so that the relay station can transmit the synchronization packet, transmitting the synchronization packet during a preset own synchronization packet transmission allocation period. Furthermore, the relay station in the synchronization maintaining mode makes a transition to the synchronization acquiring mode when a state without reception of any synchronization packet exceeds a preset limited time of synchronization information update.

According to the synchronization method for the wireless communication network system of the first invention, two mobile radio sets communicable with each other are installed on the front and rear parts of the mobile body, and when the mobile body exists between fixed radio sets, synchronization information transmitted by one fixed radio set can be relayed to the other fixed radio set by the two mobile radio sets of the mobile body. Therefore, for example, even when the propagation of radio waves between the fixed radio sets is blocked by the presence of the mobile body, such as in a tunnel or when the height of an antenna of each fixed radio set is lower than the mobile body, the relay operation of synchronization information transmitted from a base station can be continued by using the mobile radio sets. Thus, even if trouble occurs in communication between fixed radio sets, a relay of synchronization information is not blocked, so that a synchronization deviation between radio sets in the network system can be prevented and hence the synchronized state can be maintained.

Furthermore, according to the synchronization method for the wireless communication network system of the second invention, the relay station in the synchronization maintaining mode receives a synchronization packet within the limited time of synchronization information update, so that the synchronized state can be maintained. Therefore, even when a communication failure occurs in a part of the relay route of a synchronization packet, including a case where the propagation of radio waves between fixed radio sets is blocked by the presence of the mobile body, if two or more base stations are provided, a synchronization packet will be received from another base station, so that the synchronized state can be maintained, thereby preventing a synchronization deviation between radio sets in the network system.

DESCRIPTION OF THE PREFERRED EMBODIMENTS

Embodiments of the present invention will be described below with reference to the accompanying drawings.

Figure 1:
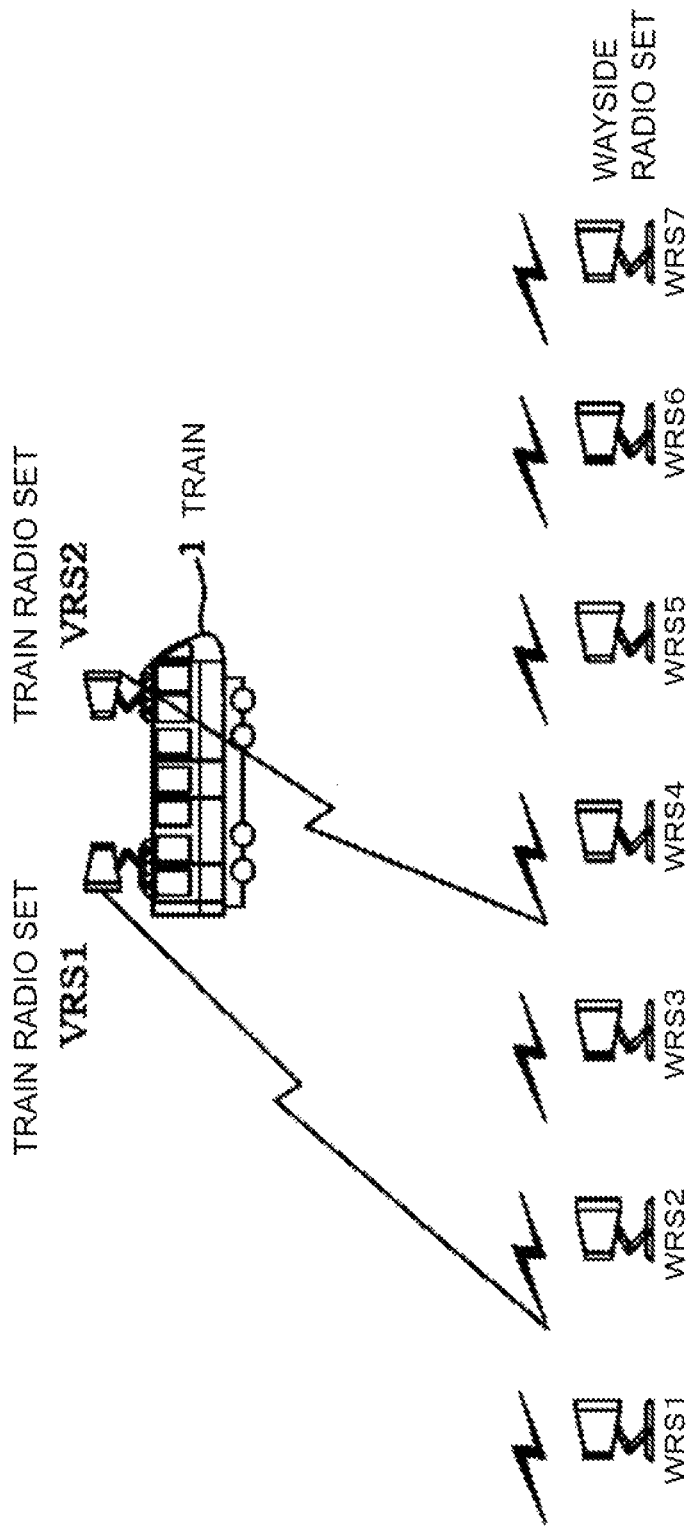
FIG. 1 is a schematic configuration diagram illustrating an example of a wireless communication network system to which a synchronization method according to the present invention is applied.

FIG. 1 is a schematic configuration diagram illustrating an example of a wireless communication network system to which a synchronization method therefor according to the present invention is applied.

In FIG. 1, the wireless communication network system is configured to include two train radio sets VRS1 and VRS2 mounted on a train 1, which is a mobile body, and a plurality of wayside radio sets WRS1 to WRS7.

The train radio sets VRS1 and VRS2 are installed on the front and rear parts of the train 1, and connected to an on-vehicle device (not illustrated) mounted in the train 1 in a manner to be communicable with each other, e.g., which are connected by a wired cable in a wired communicable manner to perform wireless communication of various kinds of information with the plurality of wayside radio sets WRS1 to WRS7 while the train 1 is moving. The train radio sets VRS1 and VRS2 correspond to mobile radio sets. Here, it is assumed that the train radio set VRS1 is installed on the rear part of the train and the train radio set VRS2 is installed on the front part of the train. The communication between the train radio sets VRS1 and VRS2 is not limited to be wired, and it may be wireless.

The wayside radio sets WRS1 to WRS7 transmit and receive various kinds of information with the train radio sets VRS1 and VRS2. The wayside radio sets are a plurality of propagation-type radio sets, that is spacially separated and installed along a railway line, which is a moving route of the train 1, so that adjacent radio sets will perform wireless communication with each other to relay and transmit information. Here, the wayside radio sets WRS1 to WRS7 correspond to fixed radio sets. These fixed radio sets are installed, for example, at such intervals that the radio waves reach a radio set after the next. Note that the number of wayside radio sets is not limited to seven, and it is set to an appropriate number according to the size of the control area of the wireless communication network system.

Figure 2:
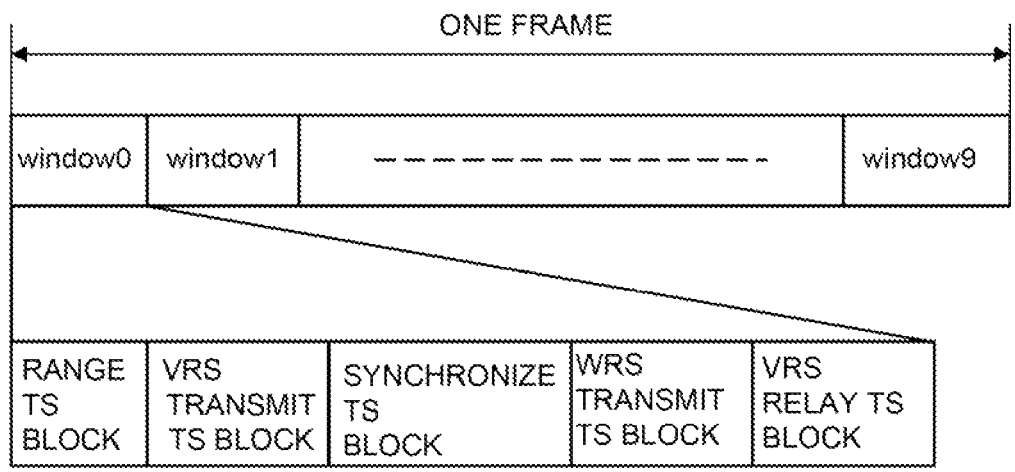
FIG. 2 is an explanatory diagram of a frame structure of a communication operation period in the wireless communication network system.

A communication control method for the wireless communication network system having such a configuration is, for example, a time division multiple access (TDMA) method, and information is transmitted from a source radio set up to a terminal radio set while relaying the information by intermediate radio sets. This wireless communication network system performs communication operation periodically using one frame illustrated in FIG. 2 as one period, and only at the time of a predetermined time slot (hereinafter referred to as TS) preallocated in one frame by configuration information, each radio set is so controlled that transmission and reception are possible. Then, the operation of all radio sets in this communication network is synchronized in a synchronize TS block provided in the frame. The synchronize TS block will be described later.

The structure of the frame will be described in brief.

One frame is divided into multiple, e.g., ten windows W0 to W9 (indicated by window in FIG. 2), and each of the windows W0 to W9 is divided into multiple time slot blocks (hereinafter referred to as TS blocks). For example, the window is made up of a range TS block for measuring distance between the train radio set VRS1, VRS2 and a wayside radio set WRS as a communication target, a VRS transmit TS block in which the train radio set VRS1, VRS2 becomes the transmission source, the synchronize TS block for synchronizing the transmission/reception operation of each radio set, a WRS transmit TS block in which the wayside radio set WRS1-WRS7 becomes the transmission source, and a VRS relay TS block for performing relay operation by the transmission of information from the train radio set VRS1, VRS2. Furthermore, each TS block is made up of a predetermined number of TSs, respectively. The VRS relay TS block is so provided that the transmission of information between wayside radio sets WRS arranged to be wirelessly communicable with each other can be relayed through the train radio sets VRS1 and VRS2.

Next, a first embodiment of the synchronization method in a first invention will be described.

The synchronization method of the present embodiment assumes a case where a train causes trouble in the propagation of radio waves between ground radio sets adjacent to each other. In this case, two train radio sets mounted on the front and rear parts of the train are used to relay, for example, a synchronization packet as synchronization information in order to maintain the synchronized state of each radio set.

In the present embodiment, for example, two of the wayside radio sets WRSs are set as base stations for transmitting a synchronization packet as the transmission source of the synchronization packet, and the other radio sets including the two train radio sets VRS1 and VRS2 are set as relay stations for relaying the synchronization packet transmitted from the base stations. Each of the base stations is equipped with a GPS receiver for receiving a reference time signal, e.g., a GPS signal, and the base stations are synchronized with each other by the reception of the GPS signal. When receiving the GPS signal, each of the base stations transmits a synchronization packet during an own transmission allocation period based on the clocking of an internal timer. In the synchronization packet, for example, source radio set type information (ground radio set or vehicle radio set), transmission time information, current time slot information, operation mode information (synchronization acquiring mode, ground synchronization maintaining mode, on-vehicle synchronization maintaining mode, or the like to be described later), and the like are included as synchronization information. Each relay station receives a synchronization packet transmitted from each base station and determines the adoption or rejection of the packet based on information in the synchronization packet. In the case of adoption, the relay station becomes the synchronized state, and relays the synchronization packet by updating the synchronization information in the synchronization packet and transmitting the synchronization packet during the own transmission allocation period.

Figure 3:
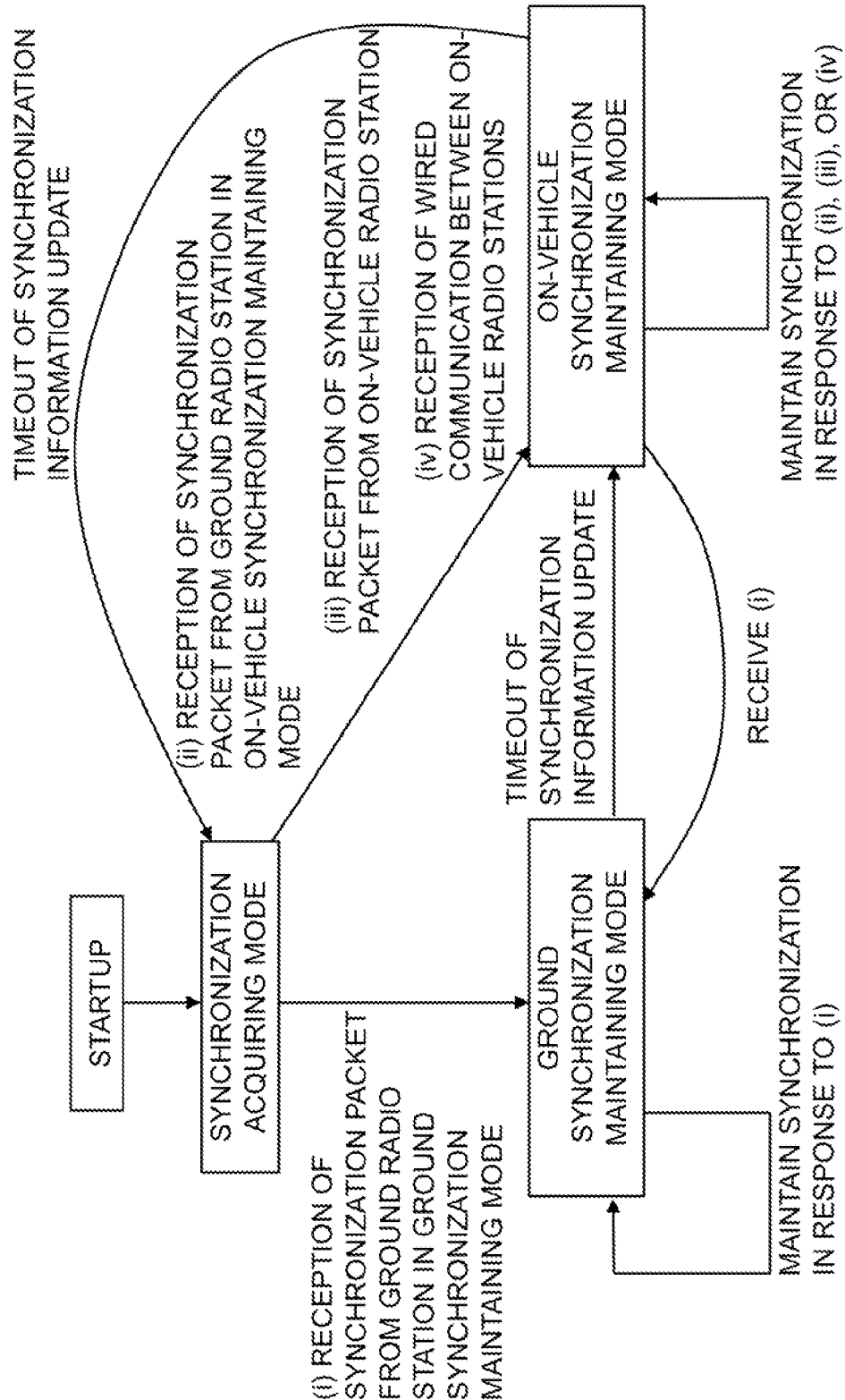
FIG. 3 is an explanatory diagram of operation mode transitions in a first embodiment of a synchronization method of a first invention.

FIG. 3 illustrates operation mode transitions from the time of starting up the power of a radio station as a relay station in the embodiment. The synchronization operation of the present embodiment will be described with reference to FIG. 3. It is assumed in FIG. 3 that the ground radio station is each radio set other than the base station installed on the ground and the on-vehicle radio station is a train radio set.

A radio station makes a transition from startup to a synchronization acquiring mode in response to the application of power. The synchronization acquiring mode is a state of waiting for the reception of a synchronization packet coming directly from a base station or transmitted while being relayed by radio stations. When receiving a synchronization packet, the radio station in the synchronization acquiring mode determines adoption based on the synchronization information, and when the received synchronization packet is (i) a synchronization packet from a ground radio station in a ground synchronization maintaining mode, the radio station makes a transition to the ground synchronization maintaining mode, and resets the internal timer to perform synchronization acquisition. In other words, the radio station comes into the synchronized state at this point. Here, the ground synchronization maintaining mode is an operation mode when a synchronization packet relayed without the intervention of the train radio sets is received, indicating that the operation mode has high synchronization accuracy.

The radio station that made the transition to the ground synchronization maintaining mode transmits the synchronization packet during the own synchronization packet transmission allocation period determined based on the clocking of the internal timer reset to start clocking. When receiving and adopting the synchronization packet again from the ground radio station in the ground synchronization maintaining mode before the clocking of the timer passes through a timeout period for synchronization information update as a preset limited time of synchronization information update, the radio station in the ground synchronization maintaining mode maintains the ground synchronization maintaining mode. On the other hand, when no synchronization packet can be received from the ground radio station in the ground synchronization maintaining mode before the clocking of the timer passes through the timeout period for synchronization information update, the radio station determines that the timeout of synchronization information update has occurred and makes a transition to an on-vehicle synchronization maintaining mode lower in synchronization accuracy than the ground synchronization maintaining mode.

Furthermore, when receiving and adopting (ii) a synchronization packet from a ground radio station in the on-vehicle synchronization maintaining mode, when receiving and adopting (iii) a synchronization packet from an on-vehicle radio station, or when receiving and adopting (iv) a synchronization packet from another on-vehicle radio station in communication between the on-vehicle radio stations, the radio station in the synchronization acquiring mode makes a transition to an on-vehicle synchronization maintaining mode, and resets the internal timer to perform synchronization acquisition. The radio station comes into the synchronized state at this point. Here, the on-vehicle synchronization maintaining mode is an operation mode when a synchronization packet relayed with the intervention of the train radio sets is received, indicating that the operation mode has synchronization accuracy lower than the ground synchronization maintaining mode mentioned above. This is because of a potential for some synchronization deviation due to the intervention of the train radio sets that are more moving than the case where the synchronization packet is relayed by the ground radio stations alone.

The radio station that made the transition to the on-vehicle synchronization maintaining mode transmits and relays the synchronization packet during the own synchronization packet transmission allocation period determined based on the clocking of the internal timer reset to start clocking. When receiving and adopting the synchronization packet from a ground radio station in the ground synchronization maintaining mode before the clocking of the timer passes through the predetermined timeout period for synchronization information update, the radio station in the on-vehicle synchronization maintaining mode makes a transition to the ground synchronization maintaining mode higher in synchronization accuracy than the on-vehicle synchronization maintaining mode, and the operation thereof becomes the operation in the ground synchronization maintaining mode mentioned above. On the other hand, in the cases of (ii) to (iv) mentioned above, the on-vehicle synchronization maintaining mode is maintained. Furthermore, when no synchronization packet can be received before the clocking of the timer passes through the timeout period for synchronization information update, the radio station determines that the timeout of synchronization information update has occurred and makes a transition to the synchronization acquiring mode.

Figure 4:
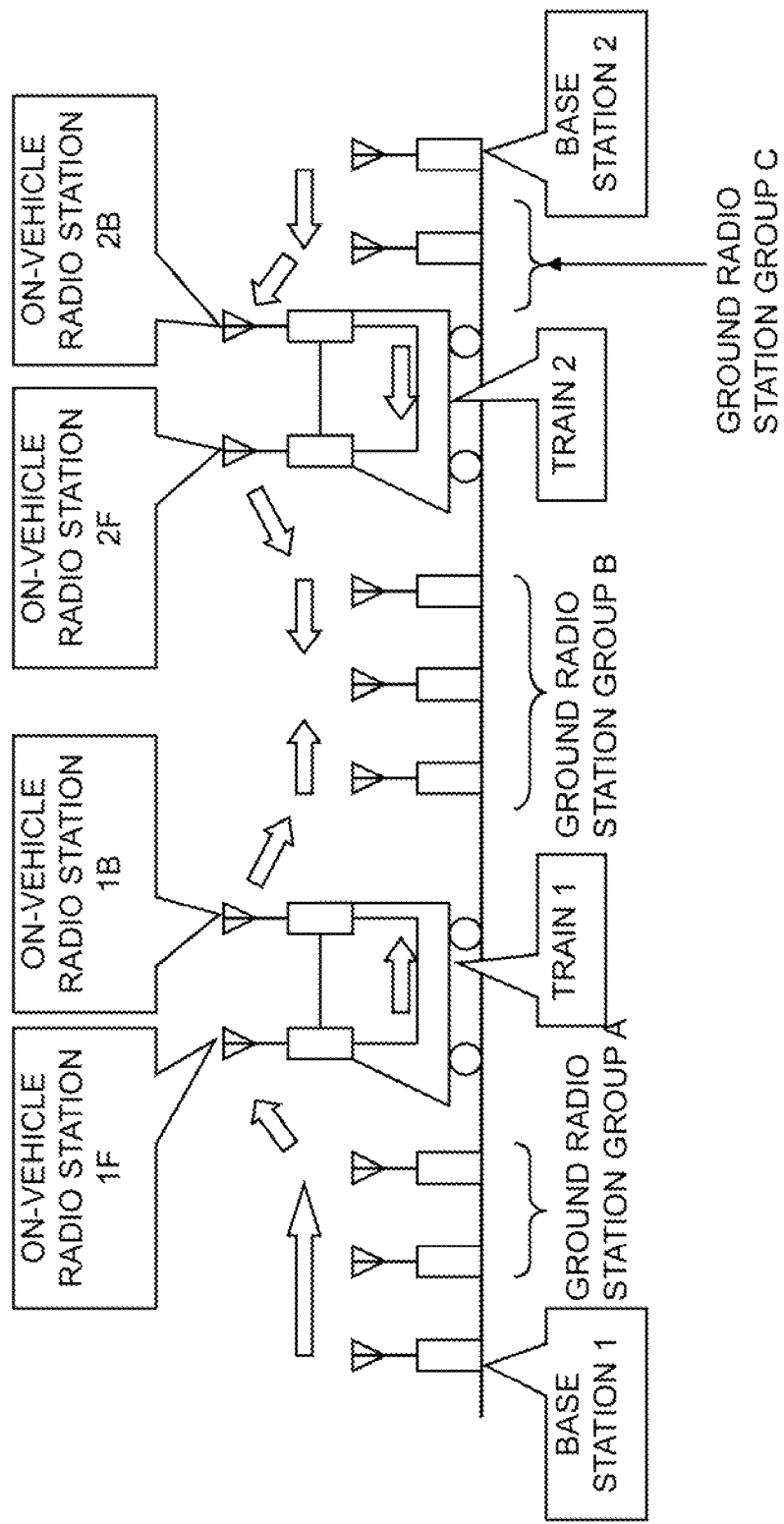
FIG. 4 is an explanatory diagram of a specific example of an operation mode transition state of on-vehicle radio stations and ground radio stations according to the synchronization method of the first embodiment.

The on-vehicle radio stations and the ground radio stations in an operation mode transition state for synchronization acquisition and synchronization maintenance by the synchronization method of the present embodiment on the assumption that trouble occurs by a train in the propagation of radio waves between ground radio sets adjacent to each other are specifically illustrated in FIG. 4, and the operation thereof will be described.

A ground radio station group A, upon receiving a synchronization packet from a base station 1, and a ground radio station group C, upon receiving a synchronization packet from a base station 2, make a transition from the synchronization acquiring mode to the ground synchronization maintaining mode as illustrated in FIG. 3, respectively. Here, it is assumed that radio waves from the ground radio station group A and the ground radio station group C do not reach a ground radio station group B placed between a train 1 and a train 2. Since an on-vehicle radio station 1F can receive the synchronization packet from the ground radio station group A, and since the ground radio station group A relays the synchronization packet from the base station 1 without the intervention of the on-vehicle radio stations, the on-vehicle radio station 1F receives the synchronization packet from a radio station in the ground synchronization maintaining mode, and the mode thereof is the ground synchronization maintaining mode (in the case of (i) in FIG. 3). Since the on-vehicle radio station 1F and an on-vehicle radio station 1B are connected, for example, by wire in a manner to be communicable with each other, so that the on-vehicle radio station 1B can receive the synchronization packet from the on-vehicle radio station 1F, and the mode of the on-vehicle radio station 1B is the on-vehicle synchronization maintaining mode (in the case of (iv) in FIG. 3). Each radio station in the ground radio station group B that receives the synchronization packet from the on-vehicle radio station 1B is also in the on-vehicle synchronization maintaining mode (in the case of (iii) in FIG. 3). Upon receiving the synchronization packet from the base station 2, the same applies to each radio station in a ground radio station group C, on-vehicle radio stations 2B and 2F on the train 2, and an each radio station in the ground radio station group B that receives a synchronization packet from the on-vehicle radio station 2F.

Thus, according to the synchronization method of the present embodiment, since a synchronization packet can be relayed using two train radio sets mounted on the front and rear parts of a train, the synchronized state of each radio set can be maintained even when trouble occurs by the train in the propagation of radio waves between ground radio sets adjacent to each other. Furthermore, when the synchronization packet cannot be received within the timeout period for synchronization information update, a radio station in the ground synchronization maintaining mode can make a transition to the on-vehicle synchronization maintaining mode, rather than the synchronization acquiring mode, to continue the transmission/reception operation in order to ensure the health of the wireless communication network system as a whole though the synchronization accuracy is somewhat lower. Furthermore, each radio station can recognize whether the synchronization packet is a synchronization packet relayed with the intervention of train radio sets or a synchronization packet relayed through ground radio sets alone without the intervention of train radio sets, and this allows the radio station to maintain the wireless communication network system while understanding the current synchronization accuracy thereof. When two or more base stations are provided, even if trouble occurs in relay transmission of a synchronization packet from one base station due to a failure of a radio station or the like, since the synchronization packet can be transmitted from another base station, the synchronization can be maintained.

When each radio station as a relay station is synchronized with a base station, it is desired for the radio station to perform synchronization acquisition and synchronization maintenance using a synchronization packet as latest as possible in order to secure the synchronization accuracy in consideration of the fact that an error is included even in the time base of the base station. In this respect, it is desired to use a synchronization packet transmitted from the direction of the base station, to perform synchronization.

A second embodiment of the synchronization method in the first invention is to give priority to use of a synchronization packet transmitted from the direction of a base station to perform synchronization.

In the present embodiment, a clock level as determination information for preferentially adopting a synchronization packet transmitted from the direction of the base station is added as one piece of synchronization information in the synchronization packet. The clock level is to represent the number of radio stations through which the received synchronization packet is propagated from the base station. The clock level of the base station is set to 0. The clock level of the other radio stations is set to a value larger than an estimated maximum number of radio stations through which the synchronization packet is expected to be propagated from the base station upon startup and in the synchronization acquiring mode in FIG. 3. For example, the clock level may be a numerical value larger than the total number of radio stations to be synchronized in the network system. Then, when receiving a synchronization packet, a relay station in the ground synchronization maintaining mode or the on-vehicle synchronization maintaining mode compares clock level information included in the synchronization packet with own clock level information stored and held by the relay station, and then, when an own clock level value is larger, the relay station determines that the synchronization packet has been received, adds one to the clock level value of the synchronization packet, and stores and holds the clock level value as own clock level information.

The operation of such a second embodiment will be specifically described.

For example, assuming that a radio station in the synchronization acquiring mode receives a synchronization packet directly from a base station, the radio station compares clock level information included in the received synchronization packet with own clock level information held by the radio station. In this case, the value of the clock level information included in the synchronization packet directly from the base station is "0", and the value of the clock level information held by the radio station that received the synchronization packet is larger than 0. Therefore, the radio station that received the synchronization packet determines that the synchronization packet is a synchronization packet received from the direction of the base station, and adopts the synchronization packet. Then, the radio station adds "1" to "0" and holds the value as own clock level information. After receiving the synchronization packet and making a transition to the ground synchronization maintaining mode, when the radio station transmits a synchronization packet, the radio station transmits a synchronization packet by adding the clock level value "1" held by the radio station to the synchronization packet as clock level information of the synchronization packet to be transmitted. Thus, each of radio stations in the ground synchronization maintaining mode and the on-vehicle synchronization maintaining mode adds "1" to the received clock level value and held the value as an own clock level value each time a synchronization packet having clock level information smaller in value than the own clock level is received.

According to such a configuration, since the clock level of each radio station takes a larger value in order from the direction of the base station, the radio station can preferentially adopt a synchronization packet from the direction of the base station, without adopting a synchronization packet from a radio station on the side opposite to the base station when receiving this synchronization packet.

A third embodiment of the synchronization method in the first invention will be described.

A synchronization packet is received in a period of the base station to transmit a synchronization packet (e.g., one second). Suppose that a synchronization packet from the direction of the base station cannot be received. In this case, even when a synchronization packet is received from any other route, if the clock level value is small, the radio station is not able to adopt the synchronization packet, and makes a transition to the synchronization acquiring mode because of the timeout of synchronization information update (e.g., one minute) to wait for the reception of a synchronization packet from the direction of another base station. This may deteriorate the synchronization accuracy or cause a synchronization deviation.

The synchronization method of the third embodiment is to allow the adoption of a synchronization packet received from another route within a timeout period for synchronization information update even when no synchronization packet can be received from the direction of the base station. Therefore, in the third embodiment, the radio station increments an own clock level held by the radio station, for example, one by one every appropriate period, which is shorter than the timeout period for synchronization information update and longer than the synchronization packet transmission period.

In such a configuration, even when no synchronization packet can be received from the direction of the base station due to trouble on a relay route on the base station side, the own clock level gradually increases. Therefore, if the clock level of the radio station that cannot receive any synchronization packet exceeds a clock level value included in a synchronization packet coming from another route (e.g., a route on side of another base station) within the timeout period for synchronization information update, the radio station can adopt the synchronization packet from the other route, and this allows the radio station to maintain the synchronization maintaining mode without making a transition to the synchronization acquiring mode.

A fourth embodiment of the synchronization method in the first invention will be described.

The third embodiment can maintain the synchronization maintaining mode even when trouble occurs on a relay route on one base station side, but a radio station that cannot receive any synchronization packet may reach the timeout of synchronization information update because it takes time for the clock level value of the radio station to exceed the clock level included in the synchronization packet from the other route.

The fourth embodiment enables more quick synchronization maintenance even when trouble occurs on a relay route.

In the fourth embodiment, master time information is added as one piece of synchronization information in the synchronization packet instead of the clock level information. The master time is the time when a base station transmitted a synchronization packet, i.e., it represents a synchronization packet transmission time of the base station, and reference time information such as GPS signal time information received by the base station and matching between two or more base stations among pieces of time information determined by the base stations may be used.

In such a configuration, when receiving a synchronization packet in the ground synchronization maintaining mode or the on-vehicle synchronization maintaining mode, a radio station compares master time information included in the synchronization packet with own master time information stored and held by the radio station. When the comparison result indicates that the master time information in the received synchronization packet is newer, the radio station adopts the received synchronization packet and holds the master time information in the received synchronization packet as own master time information.

According to the fourth embodiment, among synchronization packets received from two base stations, for example, a synchronization packet as latest as possible is adopted. Furthermore, even when trouble occurs on the relay route of one of the two base stations, the radio station maintains the synchronization maintaining mode when receiving, from the direction of the other base station, a synchronization packet including master time information newer than the own master time information. Thus, the latest synchronization packet can be adopted more quickly than the synchronization method of the third embodiment for incrementing the clock level value.

A fifth embodiment in the first invention will be described.

The synchronization method of the fifth embodiment is to use clock level information and master time information together. In the fifth embodiment, master time information and clock level information are included in a synchronization packet. Then, in the fifth embodiment, when either of the following conditions (1) and (2) are met, the received synchronization packet is adopted:

(1) when master time information included in the received synchronization packet is newer than own master time information held; and (2) when master time information included in the received synchronization packet is equal to the own master time information held and a clock level value included in the received synchronization packet is smaller than an own clock level value held.

According to the synchronization method of this embodiment, among synchronization packets received from two base stations, for example, not only can the latest synchronization packet be adopted, but also a synchronization packet from the direction of a base station can be adopted preferentially.

The base stations in each of the aforementioned embodiments operate as relay stations when reference time information cannot be received due to a failure of a GPS signal receiver or the like.

Figure 5:
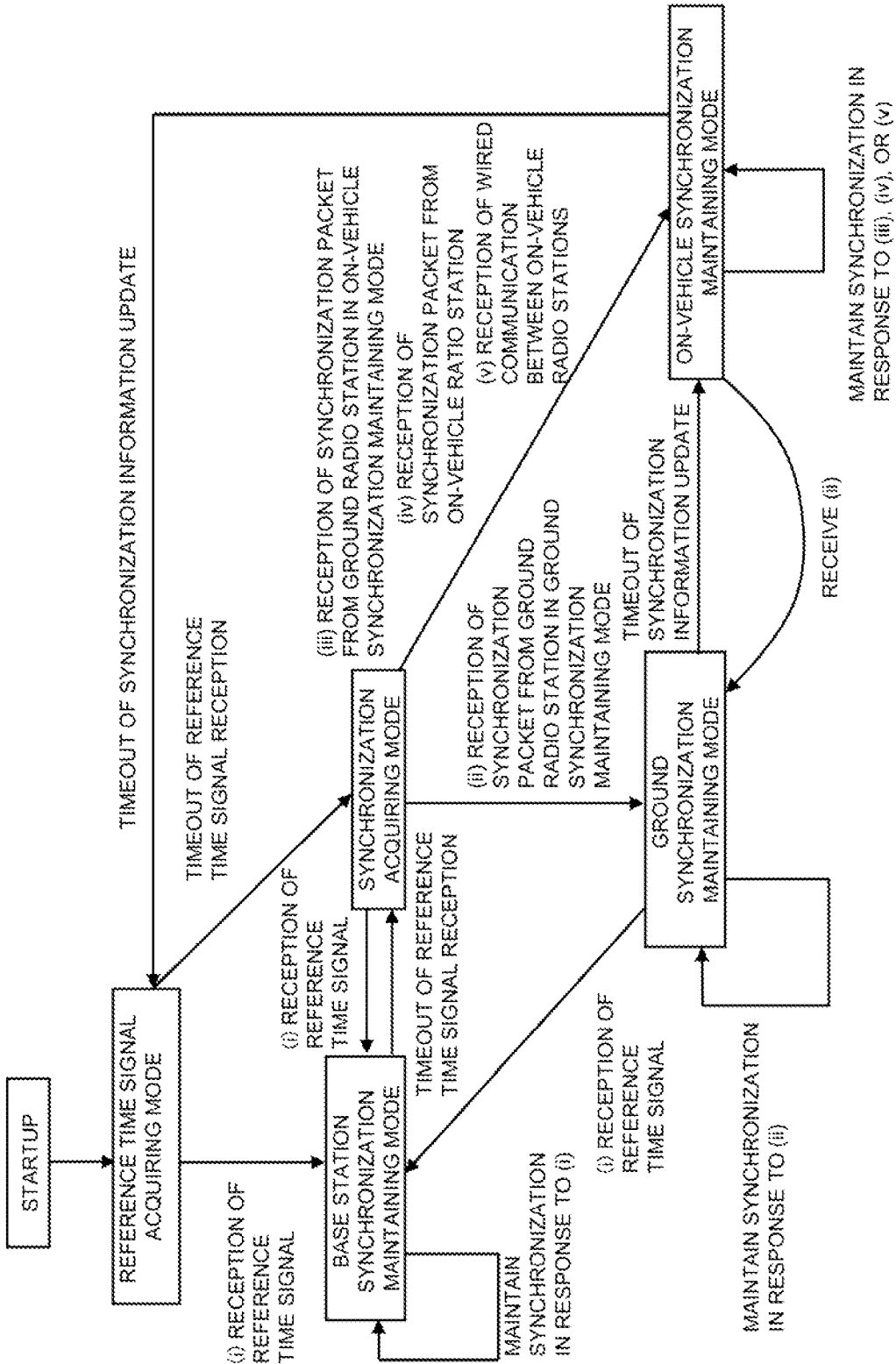
FIG. 5 is an explanatory diagram of operation mode transitions of a base station in the first invention.

FIG. 5 illustrates operation mode transitions from the time of starting up the power of a base station, and the operation will be described.

The base station makes a transition from startup to a reference time signal acquiring mode in response to the application of power. In the reference time signal acquiring mode, the base station waits for the reception of a GPS signal as a reference time signal until a timeout period for reference time signal reception as a predetermined limited time of reference time signal reception elapses. When receiving a GPS signal within the timeout period for reference time signal reception ((i) in the figure), the base station in the reference time signal acquiring mode makes a transition to a base station synchronization maintaining mode indicating that synchronization accuracy is higher than the ground synchronization maintaining mode. The base station that made the transition to the base station synchronization maintaining mode transmits a synchronization packet during an own synchronization packet transmission allocation period based on the clocking of the internal timer. When receiving the GPS signal again before the clocking of the timer passes through the timeout period for reference time signal reception, the base station in the base station synchronization maintaining mode resets the internal timer to maintain the base station synchronization maintaining mode. On the other hand, when no GPS signal is received within the timeout period for reference time signal reception based on the clocking of the internal timer, the base station determines that the timeout of reference time signal reception has occurred and makes a transition to the synchronization acquiring mode.

Even when no GPS signal is received within the timeout period for reference time signal reception in the reference time signal acquiring mode, the base station makes a transition to the synchronization acquiring mode. The base station that made the transition to the synchronization acquiring mode operates in the same manner as a radio station as the relay station illustrated in FIG. 3, to perform relaying of a synchronization packet. Note that (i) to (iv) in FIG. 3 are indicated as (ii) to (v) in FIG. 5. When receiving a GPS signal in the synchronization acquiring mode, the radio station makes a transition to the base station synchronization maintaining mode, to return as the base station. Furthermore, when receiving a GPS signal after making a transition from the synchronization acquiring mode to the ground synchronization maintaining mode as a radio station for relaying a synchronization packet, the radio station also makes a transition to the base station synchronization maintaining mode, to return as the base station. In addition, when the base station is in the on-vehicle synchronization maintaining mode as a radio station for a relay station, if no synchronization packet can be received within the timeout period for synchronization information update, the radio station makes a transition to the reference time signal acquiring mode.

According to such a configuration of the base station, the base station can operate as a relay station even when there is a failure in a reference time signal receiving unit. Therefore, one of radio stations just has to operate as a base station in the wireless network system as a whole, and this can strengthen the health of the wireless network system as a whole.

Next, one embodiment of the synchronization method in a second invention to which the wireless communication network system mentioned above is applied will be described.

The synchronization method in the second invention is such that, when no synchronization packet can be received from one base station due to a communication failure in some ground fixed radio sets, a synchronization packet from another base station can be received to maintain the synchronized state.

In the present embodiment, at least two of fixed radio sets (respective wayside radio sets WRSs) are set as base stations for transmitting a synchronization packet as sources of the synchronization packet, and the other fixed radio sets are set as relay stations for relaying the synchronization packet transmitted from a base station. Since the structure of each of the base stations and the relay stations is the same as that described in the first embodiment of the first invention mentioned above, redundant description will be omitted here.

Figure 6:
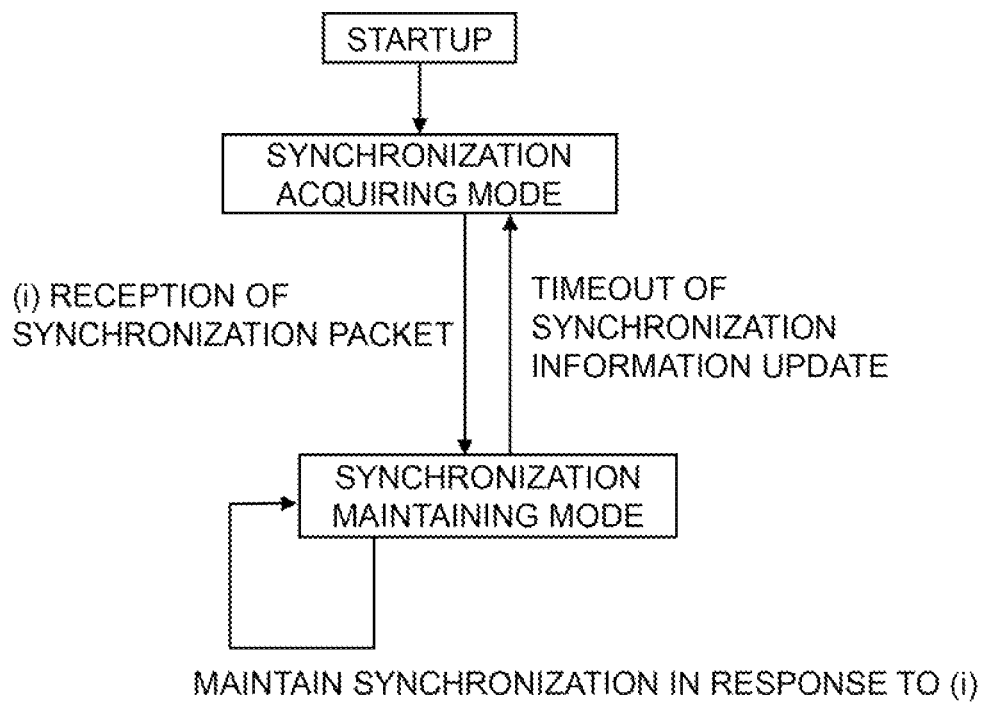
FIG. 6 is an explanatory diagram of operation mode transitions in one embodiment of a synchronization method of a second invention.

FIG. 6 illustrates operation mode transitions from the time of starting up the power of a radio station as a relay station in the present embodiment, and the synchronization operation will be described with reference to FIG. 6.

The radio station makes a transition from startup to the synchronization acquiring mode in response to the application of power. The synchronization acquiring mode is a state of waiting for the reception of a synchronization packet coming directly from a base station or transmitted while being relayed by radio stations. When receiving a synchronization packet, the radio station in the synchronization acquiring mode determines adoption based on the synchronization information, makes a transition to the synchronization maintaining mode, and resets the internal timer to perform synchronization acquisition. In other words, the radio station comes into the synchronized state at this point.

The radio station that made the transition to the synchronization maintaining mode transmits the synchronization packet during an own synchronization packet transmission allocation period determined based on the clocking of the internal timer reset to start clocking. When receiving and adopting the synchronization packet again before the clocking of the timer passes through a timeout period for synchronization information update as a predetermined limited time of synchronization information update, the radio station in the synchronization maintaining mode maintains the synchronization maintaining mode. On the other hand, when no synchronization packet can be received before the clocking of the timer passes through the timeout period for synchronization information update, the radio station determines that the timeout of synchronization information update has occurred and makes a transition to the synchronization acquiring mode.

According to the synchronization method of this embodiment, if the radio station in the synchronization maintaining mode can receive and adopt a synchronization packet within the timeout period for synchronization information update, the radio station can adopt the synchronization packet regardless of the relay route of the synchronization packet, to maintain the synchronized state. Therefore, if two base stations are provided to transmit a synchronization packet, the synchronized state can be maintained without causing a synchronization deviation or the like even when a communication failure occurs in some fixed radio sets.

Figure 7:
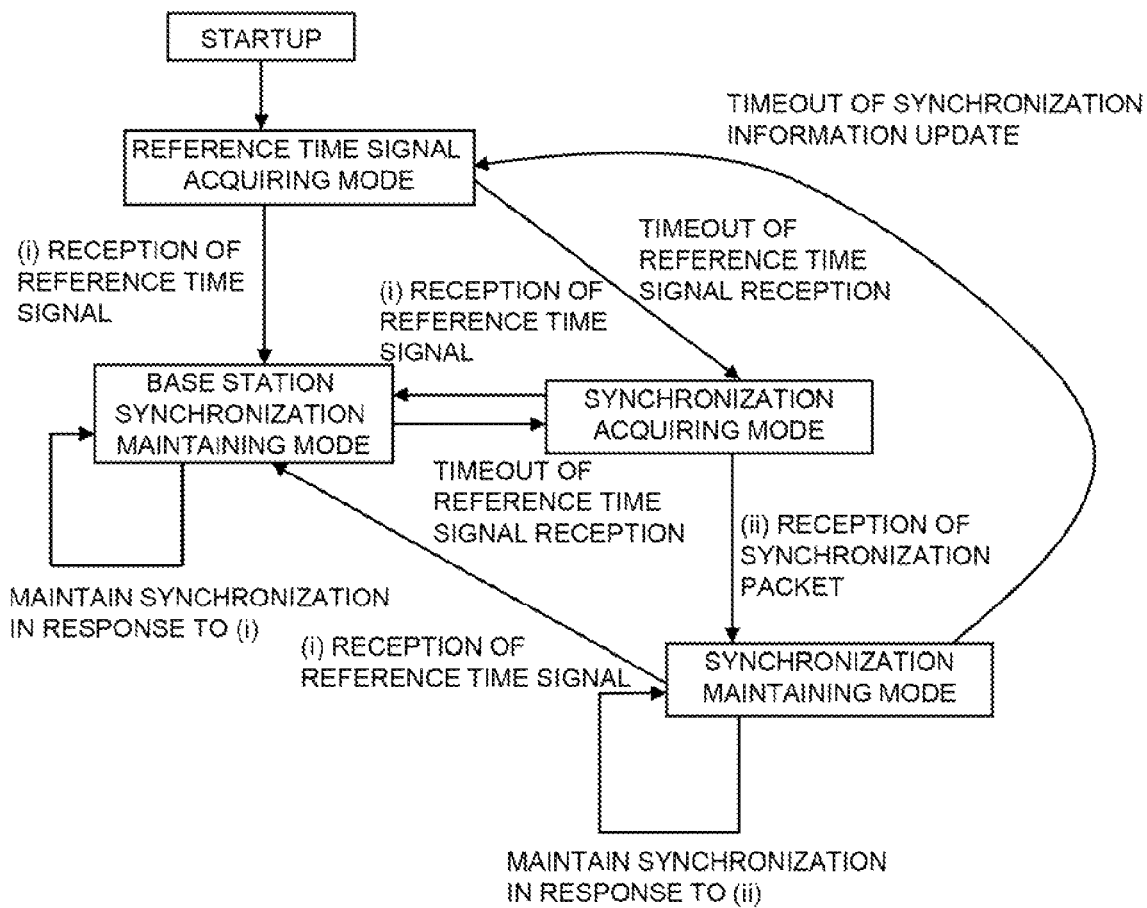
FIG. 7 is an explanatory diagram of operation mode transitions of a base station in the second invention.

Furthermore, a base station in the present embodiment is also configured to operate as a relay station when the base station cannot receive reference time information. FIG. 7 illustrates operation mode transitions from the time of starting up the power of such a base station, and the operation will be described.

The base station makes a transition from startup to the reference time signal acquiring mode in response to the application of power. In the reference time signal acquiring mode, the reception of a GPS signal as a reference time signal is kept waiting until a timeout period for reference time signal reception as a predetermined limited time of reference time signal reception elapses. When receiving a GPS signal within the timeout period for reference time signal reception ((i) in the figure), the base station in the reference time signal acquiring mode makes a transition to the base station synchronization maintaining mode indicating that synchronization accuracy is higher than the ground synchronization maintaining mode mentioned above. The base station that made the transition to the base station synchronization maintaining mode transmits a synchronization packet during an own synchronization packet transmission allocation period based on the clocking of the internal timer. When receiving a GPS signal again before the timeout period for reference time signal reception elapses, the base station in the base station synchronization maintaining mode resets the internal timer, to maintain the base station synchronization maintaining mode. On the other hand, when no GPS signal is received within the timeout period for reference time signal reception based on the clocking of the internal timer, the base station determines that the timeout of reference time signal reception has occurred and makes a transition to the synchronization acquiring mode.

Furthermore, in the reference time signal acquiring mode, when no GPS signal is received within the timeout period for reference time signal reception, the base station also makes a transition to the synchronization acquiring mode. The base station that made the transition to the synchronization acquiring mode operates in the same manner as a radio station for the relay station illustrated in FIG. 6 to perform relaying of a synchronization packet. Note that (i) in FIG. 6 is indicated as (ii) in FIG. 7. However, when receiving a GPS signal in the synchronization acquiring mode, the radio station makes a transition to the base station synchronization maintaining mode, to return as the base station. Furthermore, when receiving a GPS signal after making a transition from the synchronization acquiring mode to the synchronization maintaining mode as a radio station for relaying a synchronization packet, the radio station also makes a transition to the base station synchronization maintaining mode, to return as the base station. In addition, when the base station is in the synchronization maintaining mode, if no synchronization packet can be received within the timeout period for synchronization information update, the base station makes a transition to the reference time signal acquiring mode.

According to such a configuration of the base station, the base station can operate as a relay station even when there is a failure in the reference time signal receiving unit. Therefore, one of radio stations just has to operate as a base station in the wireless network system as a whole, and this can strengthen the health of the wireless network system as a whole.

Note that the structure for adding clock level information to a synchronization packet like in the second embodiment of the first invention, the structure for incrementing the own clock level held by the radio station one by one every appropriate period, which is shorter than the timeout period for synchronization information update and longer than the synchronization packet transmission period like in the third embodiment, the structure for adding master time information to a synchronization packet like in the fourth embodiment, or the structure for adding and using clock level information and master time information together like in the fifth embodiment can be applied to the embodiment of the synchronization method of the second invention illustrated in FIG. 6 to obtain similar effects, respectively.

While use of a GPS signal as reference time information has been exemplified in each of the aforementioned embodiments, the present invention is not limited thereto. For example, a reference signal generator having extremely high accuracy such as a wave clock may be provided in a network system to extract a reference time signal therefrom.

It should be noted that the entire contents of Japanese Patent Application No. 2011-218180, filed on Sep. 30, 2011, on which convention priority is claimed, is incorporated herein by reference.

It should also be understood that many modifications and variations of the described embodiments of the invention will be apparent to a person having an ordinary skill in the art without departing from the spirit and scope of the present invention as claimed in the appended claims.

What is claimed is:

1. A synchronization method for a wireless communication network system, the wireless communication network system comprising:
   mobile radio sets that are installed on front and rear parts of a mobile body moving along a predetermined route in a manner to be communicable with each other; and
   a plurality of fixed radio sets spatially separated and installed along the predetermined route in such a manner that adjacent fixed radio sets perform wireless communication with each other to transmit information while relaying the information from a transmission source to a terminal fixed radio set, wherein the mobile radio sets and the plurality of fixed radio sets are time-synchronized in a communicable manner to perform communication, the synchronization method for the wireless communication network system comprising:
   sequentially relaying and transmitting a synchronization information by the plurality of fixed radio sets; and
   relaying the synchronization information between fixed radio sets by the mobile radio sets installed on the front and rear parts of the mobile body when the mobile body exists between the fixed radio sets, wherein:
      at least one of the plurality of fixed radio sets is set as a base station for transmitting a synchronization packet as the synchronization information, and other fixed radio sets and the mobile radio sets are set as relay stations for relaying the synchronization packet transmitted from the base station, and
      the other fixed radio sets do not adopt a synchronization packet relayed with intervention of the mobile radio sets while a synchronization packet relayed without intervention of the mobile radio sets is being received and adopted periodically.

2. The synchronization method for the wireless communication network system according to claim 1, wherein after making a transition to a synchronization acquiring mode that is a state of waiting for reception of a synchronization packet in response to application of power,
   when receiving a synchronization packet relayed without intervention of the mobile radio sets, each of the relay stations in the synchronization acquiring mode makes a transition to a ground synchronization maintaining mode indicating that synchronization accuracy is high, so that a relay station can transmit the synchronization packet during a preset own synchronization packet transmission allocation period,
   when receiving a synchronization packet relayed with intervention of the mobile radio sets, each of the relay station in the synchronization acquiring mode makes a transition to on-vehicle synchronization maintaining mode indicating that synchronization accuracy is lower than the ground synchronization maintaining mode, so that the relay station can transmit the synchronization packet during the preset own synchronization packet transmission allocation period, and when the relay station in the on-vehicle synchronization maintaining mode receives a synchronization packet from another relay station in the ground synchronization maintaining mode, the relay station makes a transition to the ground synchronization maintaining mode.

3. The synchronization method for the wireless communication network system according to claim 2, wherein:

when the relay station in the ground synchronization maintaining mode or the on-vehicle synchronization maintaining mode receives a synchronization packet, the relay station compares master time information, which is included in the synchronization packet and indicative of a synchronization packet transmission time of the base station, with own master time information stored and held by the relay station, and when the master time information in the received synchronization packet is newer, the relay station determines that the synchronization packet has been received, and stores and holds the master time information in the synchronization packet as own master time information.

4. The synchronization method for the wireless communication network system according to claim 2, wherein:

when the relay station in the ground synchronization maintaining mode or the on-vehicle synchronization maintaining mode receives a synchronization packet, the relay station compares clock level information, which is included in the synchronization packet and indicative of a number of relay stations through which the synchronization packet goes from the base station until reception, with own clock level information stored and held by the relay station, and when an own clock level value is larger than a clock level value in the received synchronization packet, the relay station determines that the synchronization packet has been received, adds one to a clock level value of the synchronization packet, and stores and holds an obtained clock level value as own clock level information, while the base station prestores clock level information indicative of a transmission source of the synchronization packet, and the relay station in the synchronization acquiring mode prestores, as clock level information, a value larger than an estimated maximum number of relay stations through which the synchronization packet is expected to go from the base station until reception.

5. The synchronization method for the wireless communication network system according to claim 4, wherein the relay station in the on-vehicle synchronization maintaining mode increments the clock level value by a constant value every period shorter than a limited time of synchronization information update until receiving a synchronization packet before making a transition to the synchronization acquiring mode.

6. The synchronization method for the wireless communication network system according to claim 2, wherein:

when the relay station in the ground synchronization maintaining mode or the on-vehicle synchronization maintaining mode receives a synchronization packet, the relay station compares master time information, which is included in the synchronization packet and indicative of a synchronization packet transmission time of the base station, and clock level information, which is indicative of a number of relay stations through which the synchronization packet goes from the base station until reception, with own master time information and own clock level information stored and held by the relay station, respectively, and when the master time information in the received synchronization packet is newer, or when an own clock level value is larger than a clock level value in the received synchronization packet if both pieces of master time information are identical, the relay station determines that the synchronization packet has been received, stores and holds the master time information in the synchronization packet as own master time information, adds one to a clock level value of the synchronization packet, and stores and holds the obtained clock level value as own clock level information, while the base station prestores clock level information indicative of a transmission source of the synchronization packet, and the relay station in the synchronization acquiring mode prestores, as clock level information, a value larger than an estimated maximum number of relay stations through which the synchronization packet is expected to go from the base station until reception.

7. The synchronization method for the wireless communication network system according to claim 2, wherein the relay station in the on-vehicle synchronization maintaining mode makes a transition to the synchronization acquiring mode when a state without reception of any synchronization packet exceeds a preset limited time of synchronization information update.

8. The synchronization method for the wireless communication network system according to claim 1, wherein when receiving a reference time signal within a preset limited time of reference time signal reception, the base station can transmit a synchronization packet as a base station, while when receiving no reference time signal within a limited time of reference time signal reception, the base station operates as the relay station.

9. The synchronization method for the wireless communication network system according to claim 8, wherein after making a transition to a reference time signal acquiring mode that is a state of waiting for reception of a reference time signal in response to application of power, when receiving a reference time signal within a limited time of reference time signal reception, the base station in the reference time signal acquiring mode makes a transition to a base station synchronization maintaining mode indicating that synchronization accuracy is higher than the ground synchronization maintaining mode, so that the base station can transmit a synchronization packet during a preset own synchronization packet transmission allocation period, the base station in the reference time signal acquiring mode or the base station synchronization maintaining mode makes a transition to the synchronization acquiring mode when receiving no reference time signal within the limited time of reference time signal reception, the base station in the synchronization acquiring mode makes a transition to the ground synchronization maintaining mode when receiving a synchronization packet from the relay station in the ground synchronization maintaining mode or makes a transition to the on-vehicle synchronization maintaining mode when receiving a synchronization packet from the relay station in the on vehicle synchronization maintaining mode, the base station in the ground synchronization maintaining mode makes a transition to the base station synchronization maintaining mode when receiving the reference time signal, while when receiving no synchronization packet within a preset limited time of synchronization information update, the base station makes a transition to the on-vehicle synchronization maintaining mode, and the base station in the on-vehicle synchronization maintaining mode makes a transition to the reference time signal acquiring mode when receiving no synchronization packet within the limited time of synchronization information update.

10. A synchronization method for a wireless communication network system, the wireless communication network system comprising:

mobile radio sets that are mounted on a mobile body moving along a predetermined route, and a plurality of fixed radio sets spatially separated and installed along the predetermined route in such a manner that adjacent fixed radio sets perform wireless communication with each other to transmit information while relaying the information from a transmission source to a terminal fixed radio set, wherein the mobile radio sets and the fixed radio sets are time-synchronized in a communicable manner to perform communication the synchronization method for the wireless communication network system comprising:

sequentially relaying and transmitting synchronization information by the plurality of fixed radio sets, wherein:

at least one of the plurality of fixed radio sets is set as a base station for transmitting a synchronization packet as synchronization information, and other fixed radio sets are set as relay stations for relaying the synchronization packet transmitted from the base station, each of the relay stations makes a transition to a synchronization acquiring mode that is a state of waiting for reception of a synchronization packet in response to application of power, a relay station that made the transition to the synchronization acquiring mode makes a transition to a synchronization maintaining mode when receiving a synchronization packet, so that the relay station can transmit the synchronization packet during a preset own synchronization packet transmission allocation period, and the relay station in the synchronization maintaining mode makes a transition to the synchronization acquiring mode when a state without reception of any synchronization packet exceeds a preset limited time of synchronization information update.

11. The synchronization method for the wireless communication network system according to claim 10, wherein:

when receiving a synchronization packet, the relay station in the synchronization maintaining mode compares master time information, which is included in the synchronization packet and indicative of a synchronization packet transmission time of the base station, with own master time information stored and held by the relay station, and when the master time information in the received synchronization packet is newer, the relay station determines that the synchronization packet has been received, and stores and holds the master time information in the synchronization packet as own master time information.

12. The synchronization method for the wireless communication network system according to claim 10, wherein:

when receiving a synchronization packet, the relay station in the synchronization maintaining mode compares a clock level information, which is included in the synchronization packet and indicative of a number of relay stations through which the synchronization packet goes from the base station until reception, with an own clock level information stored and held by the relay station, and when an own clock level value is larger than a clock level value in the received synchronization packet, the relay station determines that the synchronization packet has been received, adds one to a clock level value of the synchronization packet, and stores and holds the obtained clock level value as own clock level information, while the base station prestores clock level information indicative of a transmission source of the synchronization packet, and the relay station in the synchronization acquiring mode prestores, as clock level information, a value larger than an estimated maximum number of relay stations through which the synchronization packet is expected to go from the base station until reception.

13. The synchronization method for the wireless communication network system, according to claim 12, wherein the relay station in the synchronization maintaining mode increments the clock level value by a constant value every period shorter than a limited time of synchronization information update until receiving a synchronization packet before making a transition to the synchronization acquiring mode.

14. The synchronization method for the wireless communication network system according to claim 10, wherein:

when receiving a synchronization packet, the relay station in the synchronization maintaining mode compares master time information, which is included in the synchronization packet and indicative of a synchronization packet transmission time of the base station, and clock level information, which is indicative of a number of relay stations through which the synchronization packet goes from the base station until reception, with own master time information and own clock level information stored and held by the relay station, respectively, and when the master time information in the received synchronization packet is newer, or when an own clock level value is larger than a clock level value in the received synchronization packet if both pieces of master time information are identical, the relay station determines that the synchronization packet has been received, stores and holds the master time information in the synchronization packet as own master time information, adds one to a clock level value of the synchronization packet, and stores and holds the obtained clock level value as own clock level information, while the base station prestores clock level information indicative of a transmission source of the synchronization packet, and the relay station in the synchronization acquiring mode prestores, as clock level information, a value larger than an estimated maximum number of relay stations through which the synchronization packet is expected to go from the base station until reception.

15. The synchronization method for the wireless communication network system according to claim 10, wherein after making a transition to a reference time signal acquiring mode that is a state of waiting for reception of a reference time signal in response to application of power, when receiving a reference time signal within a preset limited time of reference time signal reception, the base station makes a transition to a base station synchronization maintaining mode indicating that synchronization accuracy is higher than the synchronization maintaining mode, so that the base station can transmit a synchronization packet during a preset own synchronization packet transmission allocation period, the base station in the reference time signal acquiring mode or the base station synchronization maintaining mode makes a transition to the synchronization acquiring mode when receiving no reference time signal within the preset limited time of reference time signal reception, the base station in the synchronization acquiring mode makes a transition to the synchronization maintaining mode when receiving a synchronization packet, the base station in the synchronization maintaining mode makes a transition to the base station synchronization maintaining mode when receiving the reference time signal, and when receiving no synchronization packet within a preset limited time of synchronization information update, the base station makes a transition to the reference time signal acquiring mode.

16. The synchronization method for the wireless communication network system according to claim 10, wherein at least two of the fixed radio sets are set as base stations for transmitting a synchronization packet.

\* \* \* \* \*